US006877082B1

(12) United States Patent
Worrell

(10) Patent No.: US 6,877,082 B1
(45) Date of Patent: Apr. 5, 2005

(54) CENTRAL PROCESSING UNIT INCLUDING ADDRESS GENERATION SYSTEM AND INSTRUCTION FETCH APPARATUS

(75) Inventor: Frank Worrell, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 282 days.

(21) Appl. No.: 10/328,568

(22) Filed: Dec. 23, 2002

(51) Int. Cl.[7] .............................................. G06F 12/02
(52) U.S. Cl. ...................... 711/201; 711/219; 711/220; 712/204; 712/205
(58) Field of Search ................................ 711/201, 219, 711/220; 712/204, 205

(56) References Cited

U.S. PATENT DOCUMENTS 5,941,980 A * 8/1999 Shang et al. ................ 712/204

6,574,724 B1 * 6/2003 Hoyle et al. ................ 711/220

* cited by examiner

Primary Examiner—Hiep T. Nguyen
(74) Attorney, Agent, or Firm—Daffer McDaniel, LLP

(57) ABSTRACT

A disclosed address generation system includes a decrementer and a multiplexer. The decrementer produces a decremented address signal by subtracting a first integer value from an incremented address signal. The multiplexer produces either the incremented address signal or the decremented address signal dependent upon a control signal. A described instruction fetch apparatus includes an instruction queuing and selection subsystem producing either an even portion or an odd portion of an instruction data block, specified by a first address signal, as a fetched instruction dependent upon one or more control signals generated based on determining bits of second and third address signals. A disclosed central processing unit (CPU) includes an instruction cache and a processor core, wherein the processor core includes an address generation subsystem generating the first, second, and third address signals, and the instruction queuing and selection subsystem. A method is described for fetching an instruction.

20 Claims, 6 Drawing Sheets

CENTRAL PROCESSING UNIT INCLUDING ADDRESS GENERATION SYSTEM AND INSTRUCTION FETCH APPARATUS

BACKGROUND OF THE INVENTION

1. Field of the Invention

This invention relates to the field of computer processors and, more particularly, to computer processors executing variable-length instructions.

2. Description of the Related Art

Computer processor architectures may generally be classified as either complex instruction set computing (CISC) architectures or reduced instruction set computing (RISC) architectures. CISC architectures (e.g., the x86 processor architecture) specify instruction sets including high level, relatively complex instructions. Processors implementing CISC architectures often decompose complex instructions into multiple simpler operations which may be more readily implemented in hardware. RISC architectures, on the other hand, typically specify instruction sets including low level, relatively simple instructions. Complexities associated with the CISC approach are removed, resulting in simpler hardware implementations. Such simpler hardware implementations are often capable of higher frequency operation. The MIPS architecture is an exemplary RISC architecture.

Although not necessarily a defining feature, variable-length instruction sets have often been associated with CISC architectures, while fixed-length instruction sets have been associated with RISC architectures. Variable-length instruction sets use dissimilar numbers of data units (e.g., bytes) to encode instructions as well as to specify addressing modes for the instructions, etc. Generally speaking, variable-length instruction sets attempt to pack instruction information as efficiently as possible into one or more bytes representing each instruction. Conversely, fixed-length instruction sets employ the same number of data units (e.g., bytes) for each instruction. Typically, a small number of instruction formats including fixed fields of information are defined. Decoding of fixed-length instructions is thereby simplified to routing bits corresponding to each fixed field to logic designed to decode the fields.

As each instruction of a fixed-length instruction set includes a fixed number of bytes, locating instructions is simplified as well. The location of instructions subsequent to a particular instruction is implied by the location of the particular instruction (i.e. as fixed offsets from the location of the particular instruction). Conversely, locating a second variable-length instruction requires locating the end of the first variable-length instruction; locating a third variable-length instruction requires locating the end of the second variable-length instruction, etc. Still further, variable-length instructions lack the fixed field structure of fixed-length instructions. Decoding is further complicated by the lack of fixed fields.

RISC architectures employing fixed-length instruction sets suffer from problems not generally applicable to CISC architectures employing variable-length instruction sets. Because each instruction is fixed length, certain relatively simple instructions may waste memory space by occupying more bytes than needed to convey instruction information. In contrast, variable-length instruction sets typically pack instruction information into the smallest possible number of bytes.

Still further, since RISC architectures do not include the more complex instructions employed by CISC architectures, the number of instructions in a program coded with RISC instructions may be larger than the number of instructions employed in the same program coded in with CISC instructions. Each of the more complex instructions coded in the CISC version of the program is replaced by multiple instructions in the RISC version of the program. Therefore, the RISC version of a program often occupies significantly more memory than the CISC version of the program. Correspondingly, a greater instruction bandwidth is required between memory storing the program and the processor is needed for the RISC version of the program than for the CISC version of the program.

In the past, the MIPS RISC architecture supported only a 32-bit MIPS instruction set including fixed-length, 32-bit MIPS instructions. More recently, the MIPS architecture has been expanded to include an optional MIPS16 application-specific extension (ASE). The MIPS16 ASE defines both 16-bit MIPS16 instructions and 32-bit MIPS16 instructions. The MIPS16 instruction set is thus by definition a variable-length instruction set. Each "compressed" MIPS16 instruction has a corresponding "noncompressed" 32-bit MIPS instruction, and translation hardware is commonly used to translate MIPS16 instructions to corresponding 32-bit MIPS instructions for execution by a MIPS processor. The MIPS16 instruction set allows instructions to be encoded using fewer bits, and the MIPS16 version of a program often occupies significantly less memory than the 32-bit MIPS version of the same program.

A processor implementing the MIPS RISC architecture may execute instructions (i.e., code) including 32-bit MIPS instructions, MIPS16 instructions, or both 32-bit MIPS instructions and MIPS16 instructions. In the simplest implementation, 16-bit MIPS16 instructions following non-aligned MIPS16 instructions must be fetched from an instruction cache twice (i.e., refetched). Such duplicate fetches have two detrimental effects. First, even when the refetched instructions are found in an instruction cache, the duplicate fetches increase the required number of instruction cache reads, thus increasing the amount of electrical power dissipated by instruction cache logic. This increased electrical power dissipation tends to become very significant at higher clock frequencies. Second, when a refetched instruction is not found in the instruction cache, the refetched instruction must be re-fetched from an external memory. This creates a problem as bus interface logic used to access the external memory is typically optimized for sequential fetches.

An ongoing need thus exists for processors having dynamically reconfigurable hardware capable of efficiently fetching both fixed-length instructions and variable-length instructions.

SUMMARY OF THE INVENTION

An address generation system is disclosed including a decrementer and a multiplexer. The decrementer receives an incremented address signal and subtracts a first integer value from the incremented address signal, thereby producing a decremented address signal. The multiplexer receives the incremented address signal, the decremented address signal, and a control signal, and produces either the incremented address signal or the decremented address signal as an output address signal dependent upon the control signal.

An instruction fetch apparatus is described including an instruction queuing and selection subsystem. The instruction queuing and selection subsystem receives an instruction data block specified by a first address signal, and one or more control signals generated dependent upon a determining bit of a second address signal and a determining bit of a third address signal. The instruction queuing and selection subsystem produces either an even portion or an odd portion of the instruction data block as a fetched instruction dependent upon the control signals.

A central processing unit (CPU) is disclosed including an instruction cache and a processor core. The processor core fetches instructions from the instruction cache and executes the instructions. An instruction fetch apparatus of the processor core includes an address generation subsystem and the above described instruction queuing and selection subsystem. The address generation subsystem generates first, second, and third address signals, each specifying an address of a corresponding instruction data block, and including a determining bit having a value that distinguishes between an even portion and an odd portion of the corresponding instruction data block.

A method is described for fetching an instruction, including generating the first, second, and third address signal. The instruction data block corresponding to the first address signal is received, and either the even portion or the odd portion of the instruction data block corresponding to the first address signal is produced as a fetched instruction dependent upon the values of the determining bits of the second and third address signals.

BRIEF DESCRIPTION OF THE DRAWINGS

Other objects and advantages of the invention will become apparent upon reading the following detailed description and upon reference to the accompanying drawings in which.

Figure 1:
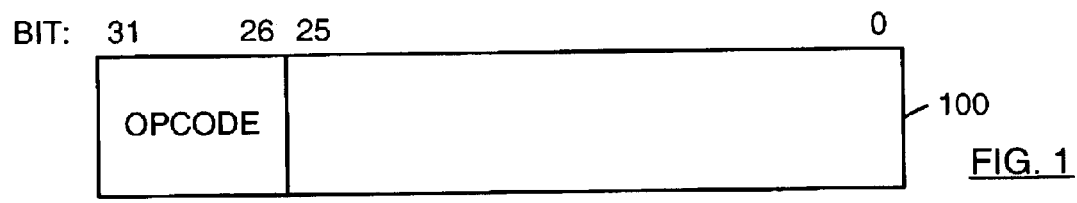
FIG. 1 is a generic format of a fixed-length, 32-bit MIPS instruction.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 is a generic format of a fixed-length, 32-bit MIPS instruction 100. The 6 most significant (i.e., highest ordered) bits 26–31 of the 32-bit MIPS instruction 100 specify an operation code (i.e., opcode).

Figure 2A:
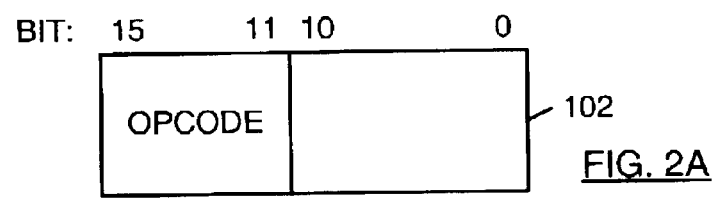
FIG. 2A is a generic format of a 16-bit MIPS16 instruction.
Figure 2B:
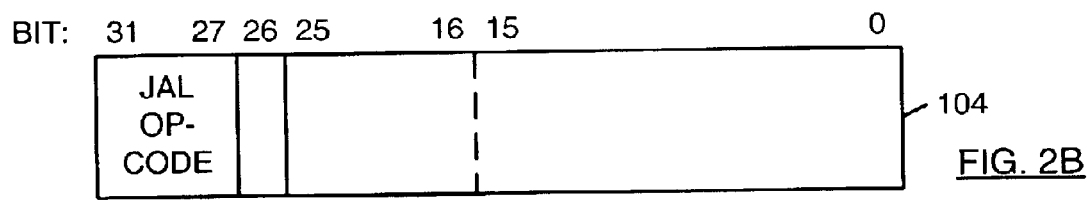
FIG. 2B is a generic format of a 32-bit MIPS16 Jump-And-Link/Jump-And-Link-Exchange (JAL/JALX) instruction.
Figure 2C:
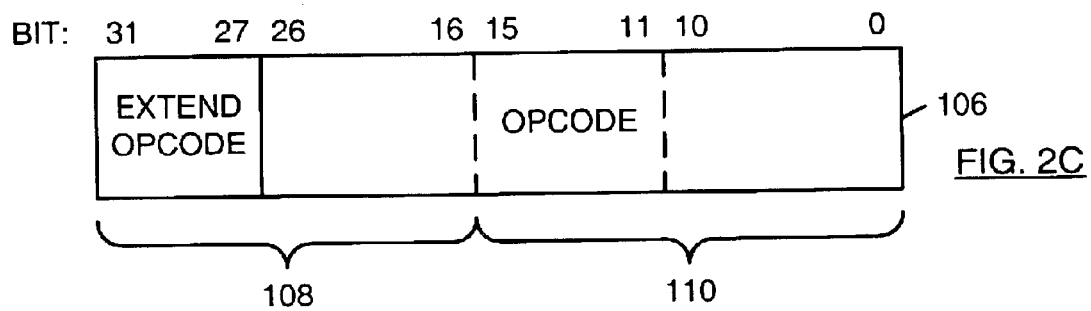
FIG. 2C is a generic format of a 32-bit MIPS16 EXTEND instruction.

FIGS. 2A–2C are generic formats of MIPS16 instructions. FIG. 2A is a generic format of a 16-bit MIPS16 instruction 102. The five most significant (i.e., highest ordered) bits 11–15 of the 16-bit MIPS16 instruction 102 specify an opcode. FIG. 2B is a generic format of a 32-bit MIPS16 Jump-And-Link/Jump-And-Link-Exchange (JAL/JALX) instruction 104. It is noted that jumps between MIPS16 code sections and 32-bit MIPS code sections may be accomplished via the JALX instruction. The five most significant (i.e., highest ordered) bits 27–31 of the JAL/JALX instruction 104 specify a JAL opcode. The value of a bit 26 of the JAL/JALX instruction 104 determines whether the JAL/JALX instruction 104 is a Jump-And-Link (JAL) instruction or a Jump-And-Link-Exchange (JALX) instruction. If bit 26 is a '0,' the JAL/JALX instruction 104 is a JAL instruction. If bit 26 is a '1,' the JAL/JALX instruction 104 is a JALX instruction. The remaining 26 bits 0–25 of the JAL/JALX instruction 104 specify a part of a target address.

FIG. 2C is a generic format of a 32-bit MIPS16 EXTEND instruction 106. The MIPS 16 EXTEND instruction 106 includes a 16-bit extend portion 108 immediately preceding an extendable 16-bit MIPS16 instruction 110. The five most significant (i.e., highest ordered) bits of the extendable 16-bit MIPS16 instruction 110 (i.e., bits 11–15 of the EXTEND instruction 106) specify an opcode of the extendable 16-bit MIPS16instruction 110. The five most significant (i.e., highest ordered) bits of extend portion 108 (i.e., bits 27–31 of the EXTEND instruction 106) specify an EXTEND opcode. The remaining 11 bits of the extend portion 108 (i.e., bits 16–26 of the EXTEND instruction 106) include data used to extend the fields of the extendable 16-bit MIPS16 instruction 110.

Figure 3:
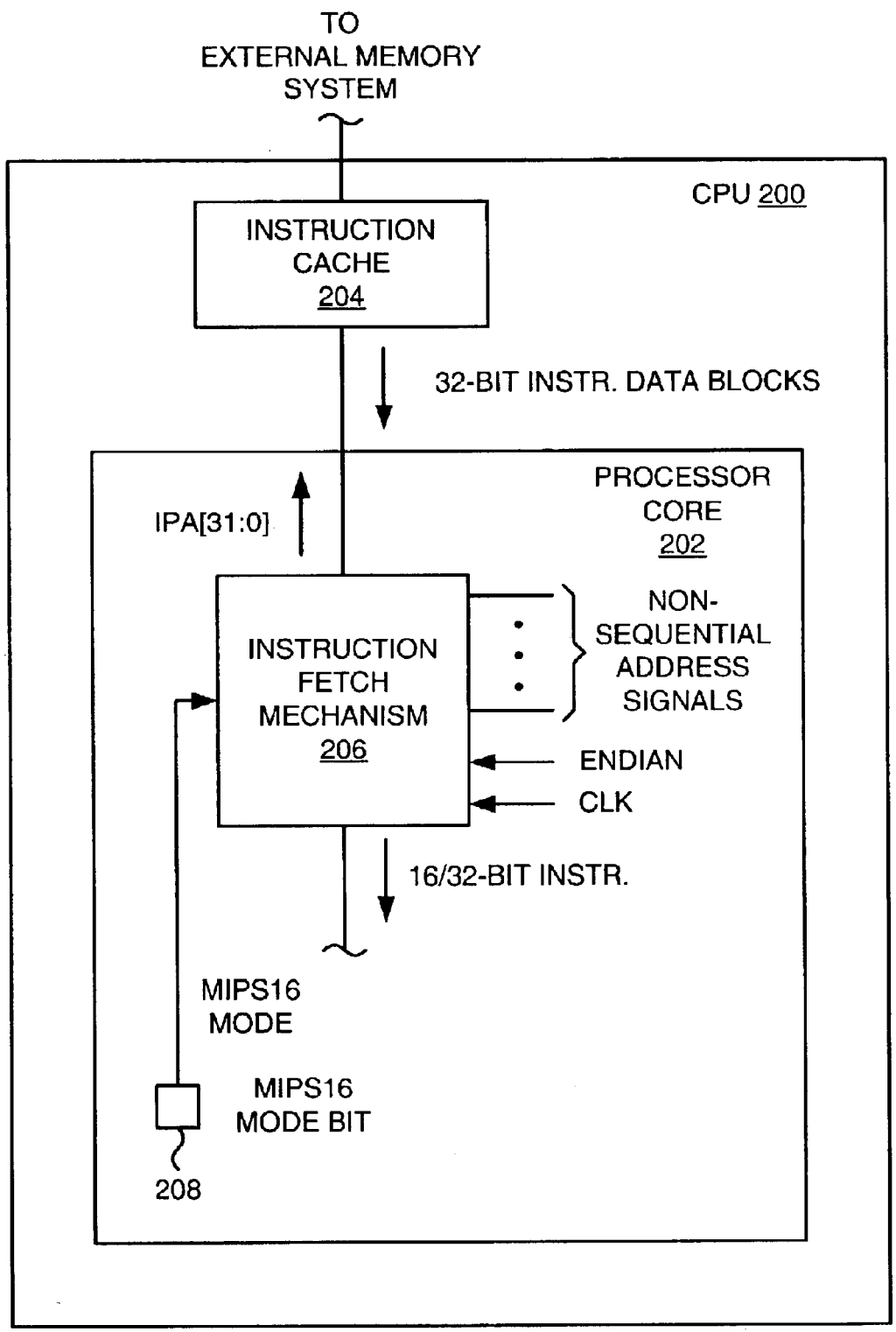
FIG. 3 is a diagram of one embodiment of a central processing unit (CPU) including a processor core having an instruction fetch mechanism.

FIG. 3 is a diagram of one embodiment of a central processing unit (CPU) 200 including a processor core 202 coupled to an instruction cache 204, wherein the processor core 202 includes an instruction fetch mechanism 206. The instruction cache 204 is used to store code from the external memory system. The instruction fetch mechanism 206 is coupled to the instruction cache 204. The instruction fetch mechanism 206 produces a 32-bit instruction prefetch address signal 'IPA[31:0],' and provides the IPA[31:0] signal to the instruction cache 204. The IPA[31:0] signal specifies a 32-bit (4-byte) block of instruction data.

The instruction cache 204 receives the IPA[31:0] signal, and provides the 32-bit block of instruction data specified by the IPA[31:0] signal to the instruction fetch mechanism 206. The instruction fetch mechanism 206 uses the 32-bit instruction data blocks to provide either 32-bit MIPS instructions or 16/32-bit MIPS16 instructions to the processor core 202.

In one embodiment, the processor core 202 is configured to execute 32-bit MIPS instructions of the 32-bit MIPS instruction set. The processor core 202 translates 16/32-bit MIPS16 instructions to 32-bit MIPS instructions, and executes the 32-bit MIPS instructions.

In general, the CPU 200 executes instructions (i.e., code) stored within an external memory system. The code may include 32-bit MIPS instructions, MIPS16 instructions, or both 32-bit MIPS instructions and MIPS16 instructions. When the code includes both 32-bit MIPS instructions and MIPS16 instructions, the 32-bit MIPS instructions and MIPS16 instructions reside in different segments or sections of the code. That is, the code may have one or more sections including only 32-bit MIPS instructions (i.e., one or more 32-bit MIPS code sections), and one or more sections including only MIPS16 instructions (i.e., one or more MIPS16 code sections).

Jump and link instructions may be used to jump between, and return from, sections of code containing MIPS16 instructions and 32-bit MIPS instructions. For example, the jump and link exchange (JALX) instruction may be used to jump from a 32-bit MIPS code section to a MIPS16 code section, or vice versa. The JALX instruction saves the next (return) address (e.g., in a link register). A jump register (JR) instruction may be used to return to the saved return address (e.g., in the link register).

The processor core 202 includes a MIPS16 mode bit 208 used to indicate a compression mode of the CPU 200. As indicated in FIG. 3, the contents of the MIPS16mode bit 208 is provided to the instruction fetch mechanism 206 as a 'MIPS16 MODE' signal. For example, a '0' may be stored in the MIPS16 mode bit 208 when the processor core 202 is executing instructions from a 32-bit MIPS code section. Similarly, a '1' may be stored in the MIPS16 mode bit 208 when the processor core 202 is executing instructions from a MIPS16 code section. The MIPS16 mode bit 208 may be changed when a flow of instruction execution jumps from one section of code containing MIPS16 instructions to another section of code containing 32-bit MIPS instructions, and vice versa. The MIPS16 mode bit 208 may also be changed when an exception occurs during instruction execution.

Multiple non-sequential address signals are generated within the processor core 202 and provided to the instruction fetch mechanism 206. The non-sequential address signals may include, for example, an address of an interrupt routine, an address specified by a branch instruction, an address of a reset routine, etc.

An ENDIAN signal produced within the processor core 202 indicates an "endian" mode of the CPU 200. For example, when the ENDIAN signal is a '1,' the CPU 200 and the external memory system coupled to the CPU 200 may be big endian. On the other hand, when the ENDIAN signal is a '0,' the CPU 200 and the memory system may be little endian. A clock signal CLK is used to synchronize the operations of various functional units within the processor core 202, including the instruction fetch mechanism 206.

As will be described in more detail below, the instruction fetch mechanism 206 uses the non-sequential address signals and the CLK signal to produce the IPA[31:0] signal, and provides the IPA[31:0] signal to the instruction cache 204. The instruction fetch mechanism 206 receives the 32-bit (4-byte) instruction data block specified by the IPA[31:0] signal from the instruction cache 204, and uses the MIPS16 MODE signal, the ENDIAN signal, and the CLK signal to produce 16-bit or 32-bit instructions from the 32-bit instruction data block.

Figure 4:
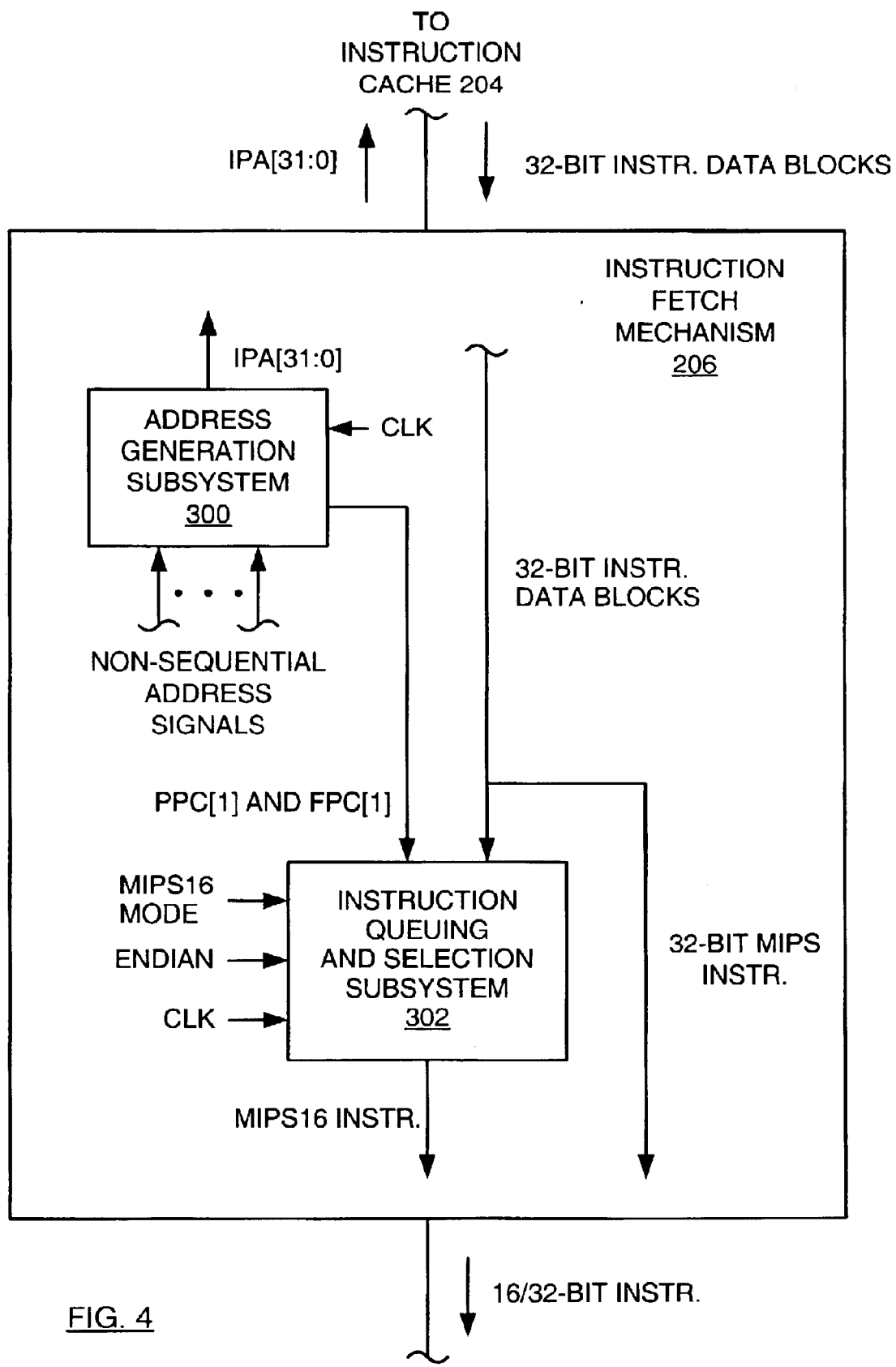
FIG. 4 is a diagram of one embodiment of the instruction fetch mechanism of FIG. 3, wherein the instruction fetch mechanism includes an address generation subsystem and an instruction queuing and selection subsystem.

FIG. 4 is a diagram of one embodiment of the instruction fetch mechanism 206 of FIG. 3. In the embodiment of FIG. 4, the instruction fetch mechanism 206 includes an address generation subsystem 300, an instruction queuing and selection subsystem 302, control logic 304, and an instruction program counter (IPC) 308. As will be described in detail below, the address generation subsystem 300 receives control signals from the control logic 304 and uses non-sequential address signals and the CLK signal to produce three 32-bit address signals dependent upon the control signals: the IPA[31:0] signal described above, a prefetch program counter signal PPC[31:0], and a fetch program counter signal FPC[31:0]. The address generation subsystem 300 provides the IPA[31:0] signal to the instruction cache 204 as described above.

In general, the IPA[31:0] signal, the PPC[31:0] signal, and the FPC[31:0] signal each specify an address of a corresponding 4-byte instruction data block. The PPC[1] bit of the PPC[31:0] signal distinguishes between an even 2-byte portion (PPC[1]=0) and an odd 2-byte portion (PPC[1]=1) of the 4-byte instruction data block specified by the PPC[31:0] signal. Similarly, the FPC[1] bit of the FPC[31:0] signal distinguishes between an even 2-byte portion (FPC[1]=0) and an odd 2-byte portion (FPC[1]=1) of the 4-byte instruction data block specified by the FPC[31:0] signal.

The instruction program counter (IPC) 308 is a program counter corresponding to an instruction register of the instruction queuing and selection subsystem 302. The instruction register is labeled "416" in FIG. 7 and described in more detail below. While the contents of the IPC 308 is essentially a registered version of the FPC[31:0] signal, for timing reasons the control logic 304 maintains the IPC 308 exclusive of the FPC[31:0] signal.

As described in more detail below, there are 3 instruction fetch cases distinguishable by the PPC[1] bit of the PPC [31:0] signal and the FPC[1] bit of the FPC[31:0] signal: aligned, unaligned sequential, and unaligned non-sequential. As indicated in FIG. 4, the control logic 304 receives a signal 'IR_LONG' from the instruction queuing and selection subsystem 302. As described in more detail below, the IR_LONG signal is indicative of whether a 16-bit portion of the instruction register, labeled "416A" in FIG. 7 and described in more detail below, contains a 16-bit MIPS16 instruction or a first half of a 32-bit MIPS16 instruction. The control logic 304 loads the IPC 308 when unaligned non-sequential instruction fetches occur, increments the contents of the IPC 308 by 2 when the portion of the instruction register contains a 16-bit MIPS16 instruction, and increments the contents of the IPC 308 by 4 when the portion the instruction register contains a first half of a 32-bit MIPS16 instruction.

The control logic 304 provides control signals to the address generation subsystem 300 and the instruction queuing and selection subsystem 302, and includes multiple state bits 306 maintained by the control logic 304. Fir timing reasons, rather than receiving the PPC[1] bit of the PPC [31:0] signal and the FPC[1] bit of the FPC[31:0] signal from the address generation subsystem 300, the control logic 304 uses the contents of f the state bits 306 to identify each of the 3 instruction fetch cases. Specifically, the contents of a state bit 306A, generated by the control logic 304, is equal to a current value of the PPC[1] bit of the PPC[31:0] signal generated by the address generation subsystem 300. A state bit 306B contains a copy of bit 1 of the IPC 308 (i.e., a copy of an IPC[1] bit of the IPC 308). For sequential fetches, the IPC[1] bit of the IPC 308 is related to the FPC[1] bit of the FPC[31:0] signal by the equation FPC[1]=IPC[1] XNOR IR_LONG, where XNOR is the exclusive NOR logic function.

The instruction queuing and selection subsystem 302 receives the 4-byte instruction data block specified by the IPA[31:0] signal from the instruction cache 204, and uses the MIPS16 MODE signal, the ENDIAN signal, the CLK signal, and control signals from the control logic 304 to produce 16-bit or 32-bit instructions from the 4-byte instruction data block. As described above, the control logic produces the control signals dependent upon the contents of the state bit 306A, an equivalent of the PPC[1] bit of the PPC[31:0] signal generated by the control logic 304, and the contents of the state bit 306B, a copy of an IPC[1] bit generated by the control logic 304 and logically related to the FPC[1] bit of the FPC[31:0] signal.

When the processor core 202 is executing instructions from a 32-bit MIPS code section, the instruction queuing and selection subsystem 302 is not active, and the instruction fetch mechanism 206 provides 32-bit MIPS instructions to the processor core 202. The processor core 202 executes the 32-bit MIPS instructions.

When the processor core 202 (FIG. 3) is executing instructions from a MIPS16 code section, the instruction queuing and selection subsystem 302 is active and produces 16/32-bit MIPS16 instructions, and the instruction fetch mechanism 206 provides the 16/32-bit MIPS16 instructions produced by the instruction queuing and selection subsystem 302 to the processor core 202. As described above, the processor core 202 translates the 16/32-bit MIPS16 instructions to 32-bit MIPS instructions, and executes the 32-bit MIPS instructions.

Figure 5A:
FIG. 5A illustrates a situation where a word-aligned 32-bit instruction data block includes a single 32-bit MIPS instruction.

FIGS. 5A–5D will now be used to illustrate possible contents of a 32-bit instruction data block provided by the instruction cache 204 and received by the instruction fetch mechanism 206. In FIGS. 5A–5D, the 32-bit instruction data block is aligned on 4-byte (i.e., word) boundaries of code sections. FIG. 5A illustrates a situation where the word-aligned 32-bit instruction data block includes a single 32-bit MIPS instruction (e.g., of a 32-bit MIPS code section).

Figure 5B:
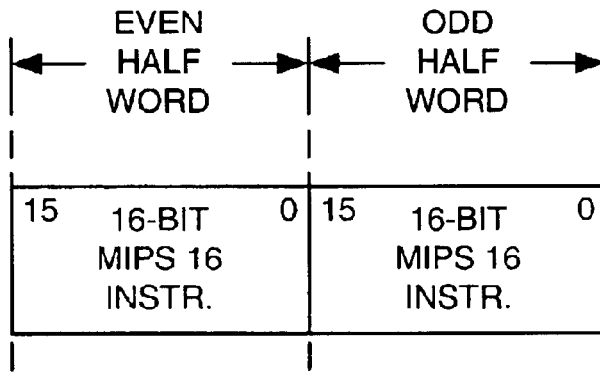
FIG. 5B illustrates a situation where the word-aligned 32-bit instruction data block includes two consecutive 16-bit MIPS16 instructions.
Figure 5C:
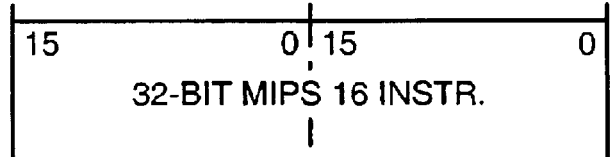
FIG. 5C illustrates a situation where the word-aligned 32-bit instruction data block includes a single 32-bit MIPS16 instruction.
Figure 5D:
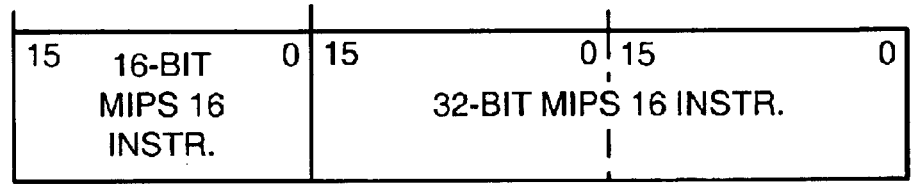
FIG. 5D illustrates a situation where the word-aligned 32-bit instruction data block includes a 16-bit MIPS16 instruction and the first 16 bits of a 32-bit MIPS16 instruction immediately following the 16-bit MIPS16 instruction.

FIGS. 5B–5D illustrate situations where the word-aligned 32-bit instruction data block includes MIPS16 instructions (e.g., of a MIPS16 code section). In FIGS. 5A–5D, each word-aligned 4-byte instruction data block is divided into an even half word (2 bytes) and an odd half word (2 bytes). A given half word is identified as even or odd based on the address of the half word. For example, an n-bit address 'A' has address bits ranging in order (significance) from a highest-ordered (most significant) address bit A[n−1] to a lowest-ordered (least significant) address bit A[0]. Even half words have addresses with A[1]=0, and odd half words have addresses with A[1]=1.

FIG. 5B illustrates a situation where the word-aligned 32-bit instruction data block includes two consecutive 16-bit MIPS16 instructions. One of the two MIPS16 instructions resides in the even half word of the 32-bit instruction data block, and the other MIPS16 instruction resides in the odd half word of the 32-bit instruction data block.

FIG. 5C illustrates a situation where the word-aligned 32-bit instruction data block includes a single 32-bit MIPS16 instruction (e.g., of a MIPS16 code section). The 32-bit MIPS16 instruction may be, for example, a JAL/JALX instruction or an EXTEND instruction. In FIG. 5C, the 32-bit MIPS16 instruction is said to be aligned on word boundaries of a MIPS16 code section (i.e., "aligned").

FIG. 5D illustrates a situation where the word-aligned 32-bit instruction data block includes a 16-bit MIPS16 instruction and the first 16 bits of a 32-bit MIPS16 instruction immediately following the 16-bit MIPS16 instruction. The 32-bit MIPS16 instruction may be, for example, a JAL/JALX instruction or an EXTEND instruction. The 16-bit MIPS16 instruction resides in the even half word of the 32-bit instruction data block, and the first 16 bits of the 32-bit MIPS16 instruction resides in the odd half word of the 32-bit instruction data block. In FIG. 5D, the 16-bit MIPS16 instruction is said to be aligned on a word boundary of a MIPS16 code section (i.e., "aligned"), and the 32-bit MIPS16 instruction is said to be "unaligned."

Figure 6:
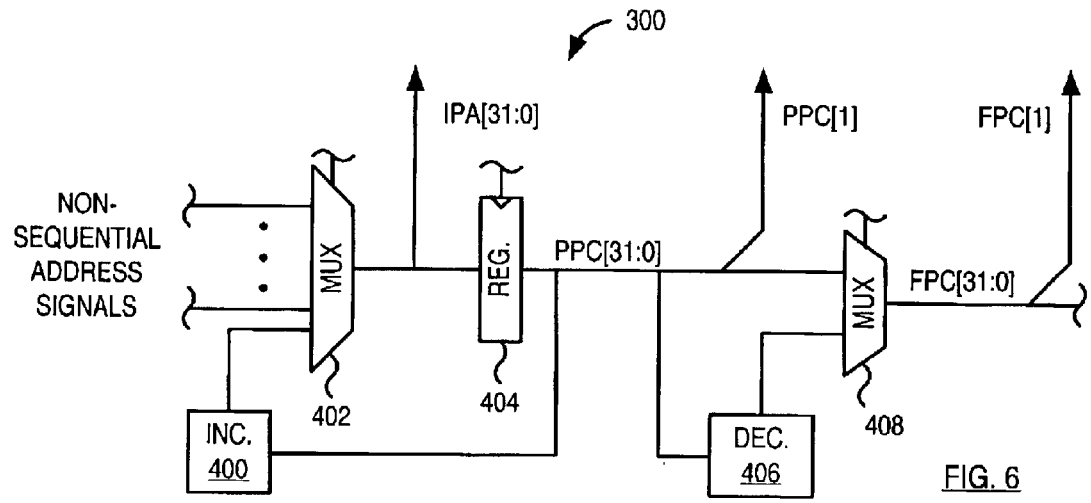
FIG. 6 is a circuit diagram of one embodiment of the address generation subsystem of FIG. 4.

FIG. 6 is a circuit diagram of one embodiment of the address generation subsystem 300 of FIG. 4. The address generation subsystem 300 includes an incrementer 400, a prefetch address multiplexer (mux) 402, a prefetch program counter register 404, a decrementer 406, and a fetch address mux 408.

The incrementer 400 generates a next sequential word address by adding the integer value '4' (4 bytes per word) to the 32-bit prefetch program counter signal PPC[31:0] produced by the prefetch program counter register 404. The prefetch address mux 402 produces the 32-bit instruction prefetch address signal IPA[31:0] described above as either one of the non-sequential address signals or the next sequential word address produced by the incrementer 400.

The prefetch program counter register 404 receives the IPA[31:0] signal at an input and produces the prefetch program counter signal PPC[31:0] described above at an output. The PPC[31:0] signal is the IPA[31:0] signal delayed in time (e.g., by one cycle of the clock signal CLK of FIGS. 3 and 4), and represents the address of a 4-byte instruction data block currently being fetched by the instruction cache 204 (FIG. 3).

The decrementer 406 subtracts the integer value '2' (2 bytes per half word) from the 32-bit PPC[31:0] signal. The fetch address mux 408 produces the fetch program counter signal FPC[31:0] described above by selecting either the PPC[31:0] signal or the decremented PPC[31:0] signal produced by the decrementer 406. The FPC[31:0] signal is thus either the PPC[31:0] signal or the PPC[31:0] signal minus '2.'

When fetching 32-bit MIPS code, each 32-bit instruction data block fetched from the instruction cache 204 (FIG. 3) contains a single 32-bit instruction, and instructions are fetched at the same rate the processor core 202 (FIG. 3) executes the instructions. In this situation, the fetch address mux 408 selects the PPC[31:0] signal produced by the prefetch program counter register 404.

When fetching MIPS16 code, many of the 32-bit instruction data blocks fetched from the instruction cache 204 (FIG. 3) may contain two 16-bit instructions, and instructions may be prefetched before the processor core 202 (FIG. 3) is ready to execute the instructions. In this situation, the fetch address mux 408 may select the decremented PPC[31:0] signal produced by the decrementer 406. That is, the fetch address mux 408 may select the decremented PPC[31:0] signal produced by the decrementer 406 when MIPS16 instructions are prefetched by the processor core 202.

Figure 7:
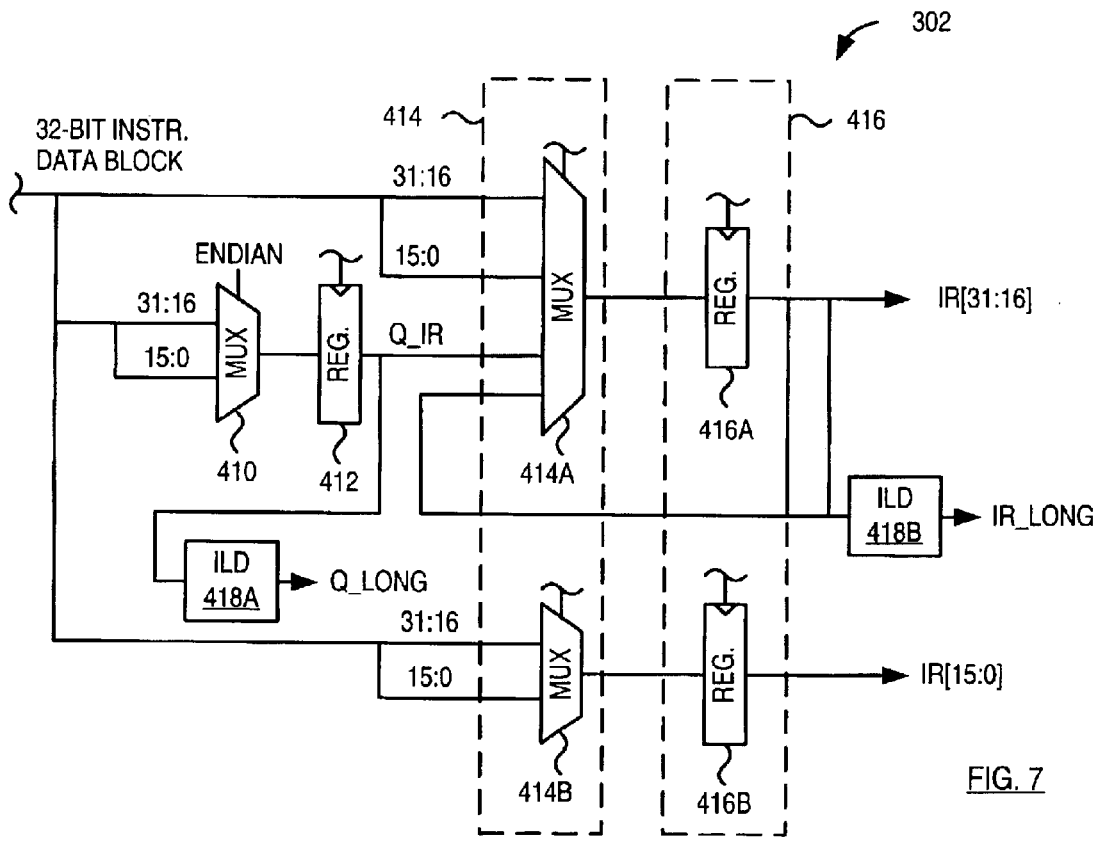
FIG. 7 is a circuit diagram of one embodiment of the instruction queuing and selection subsystem of FIG. 4.

FIG. 7 is a circuit diagram of one embodiment of the instruction queuing and selection subsystem 302 of FIG. 4. In the embodiment of FIG. 7, the instruction queuing and selection subsystem 302 includes a queued instruction selection multiplexer (mux) 410, a queued instruction register 412, an instruction selection mux 414, an instruction register 416, and two instruction length decoders (ILDs) 418A and 418B. The ILD 418A is associated with the queued instruction register 412, and the ILD 418B is associated with the instruction register 416.

In the embodiment of FIG. 7, the instruction selection mux 414 and the instruction register 416 are divided into 16-bit portions (i.e., half words). A mux 414A handles a high half word of the instruction selection mux 414, and a mux 414B handles a low half word of the instruction selection mux 414. Similarly, a register 416A handles a high half word of the instruction register 416, and a register 416B handles a low half word of the instruction register 416. It is noted that other embodiments of the instruction queuing and selection subsystem 302 are possible and contemplated.

The queued instruction selection mux 410 selects either bits 31 through 16 of a 32-bit instruction data block, or bits 15 through 0 of the 32-bit instruction data block, dependent upon the ENDIAN signal. The queued instruction register 412 stores the output of the queued instruction selection mux 410, and produces the 16-bit stored value as a 'Q_IR' signal. In the embodiment of FIG. 7, the ENDIAN signal controls the mux 410 such that the mux 410 always selects the odd half word of the 32-bit instruction data block, and the Q_IR signal is always the odd half word of the 32-bit instruction data block.

The ILD 418A produces an output signal 'Q_LONG' indicative of whether the Q_IR signal is a first half of a 32-bit MIPS16 instruction. For example, when the Q_IR signal is a 16-bit MIPS16 instruction, the Q_LONG signal may be a logic '0,' and when the Q_IR signal is a first half of a 32-bit MIPS16 instruction, the Q_LONG signal may be a logic '1.'

The ILD 418B produces an output signal 'IR_LONG' indicative of whether the IR[31:16] signal is a first half of a 32-bit MIPS16 instruction. For example, when the IR[31:16] signal is a 16-bit MIPS16 instruction, the IR_LONG signal may be a logic '0,' and when the IR[31:16] signal is a first half of a 32-bit MIPS16 instruction, the IR_LONG signal may be a logic '1.'

The instruction fetch mechanism 206 (FIG. 3) is configured to fetch MIPS16 instructions from the instruction cache 204 (FIG. 3) using a minimum number of fetches. When the CPU 200 (FIG. 3) is fetching and executing MIPS16 instructions, each 32-bit instruction data block includes two 16-bit half words as illustrated in FIGS. 5B–5D. A MIPS16 instruction is said to be "aligned" if it starts on a 32-bit word boundary, and "unaligned" if it starts in the middle of a 32-bit word.

There are 3 instruction fetch cases distinguished by the PPC[1] bit of the PPC[31:0] signal and the FPC[1] bit of the FPC[31:0] signal: aligned, unaligned sequential, and unaligned non-sequential. In the aligned instruction fetch case, PPC[1]=0 and FPC[1]=0. In this situation, the muxes 414A and 414B of the instruction selection mux 414 may be controlled such that the IR[31:16] signal is equal to the even half word of the 32-bit instruction data block, and the IR[15:0] is equal to the odd half word of the 32-bit instruction data block.

In the unaligned sequential instruction fetch case, PPC[1]=0 and FPC[1]=1. In this situation, the address generation subsystem 300 (FIGS. 4 and 6) has selected the decremented PPC[31:0] signal produced by the decrementer 406. The muxes 414A and 414B of the instruction selection mux 414 may be controlled such that the IR[31:16] signal is equal to the Q_IR signal (i.e., the odd half word of the prefetched 32-bit instruction data block), and the IR[15:0] signal is equal to the even half word of the 32-bit instruction data block. When the value of the Q_LONG signal indicates the Q_IR signal is a 16-bit MIPS16 instruction, the fetch can be killed or ignored, and the 32-bit instruction data block can be refetched using the same address.

In the unaligned non-sequential instruction fetch case, PPC[1]=1. The muxes 414A and 414B of the instruction selection mux 414 may be controlled such that the IR[31:16] signal is equal to the odd half word of the 32-bit instruction data block, and the IR[15:0] signal is a "don't care." When the value of the IR_LONG signal indicates the IR[31:16] signal is a first half of a 32-bit MIPS16 instruction, then the incomplete instruction produced by the registers 416A and 416B of the instruction register 416 must be nullified (pipeline "bubble") or squashed (pipeline stall).

When an instruction block specified by the IPA[31:0] signal is not found in the instruction cache 204 (FIG. 3), an instruction cache miss occurs. With the instruction fetch mechanism 206 described above, all that is required after an instruction cache miss is to save the previous values of PPC[1] and FPC[1] bits for use when reloading the instruction register 416 and the queued instruction register 412.

For an instruction cache miss after an unaligned sequential instruction fetch, IR[31:16] is correct and need not be reloaded. This is accomplished in the embodiment of FIG. 7 via a recirculation path providing the IR[31:16] signal to a data input of the mux 414A.

By virtue of the address generation subsystem 300 of FIGS. 4 and 6 and the instruction queuing and selection subsystem 302 of FIGS. 4 and 7, the instruction fetch mechanism 206 of FIGS. 3 and 4 efficiently fetches both fixed-length instructions (e.g., 32-bit MIPS instructions) and variable-length instructions (e.g., 16- and 32-bit MIPS16 instructions). As a result, performances of the processor core 202 of FIG. 3, and the CPU 200 of FIG. 3 including the processor core 202, are increased.

With the instruction fetch mechanism 206 of FIGS. 3 and 4, the need to fetch some 16-bit MIPS16 instructions from the instruction cache 204 of FIG. 3 more than once is reduced. For example, unlike other known instruction fetch mechanisms, there is no need to fetch unaligned 16-bit MIPS16 instructions from the instruction cache 204 more than once. As a result, a required number of instruction cache reads may be significantly reduced, thereby reducing an amount of electrical power dissipated by the instruction cache. Further, instruction fetches tend to be more sequential, which is advantageous as bus interface logic used to obtain data (including instructions) from an external memory is typically optimized for sequential fetches.

Figure 8:
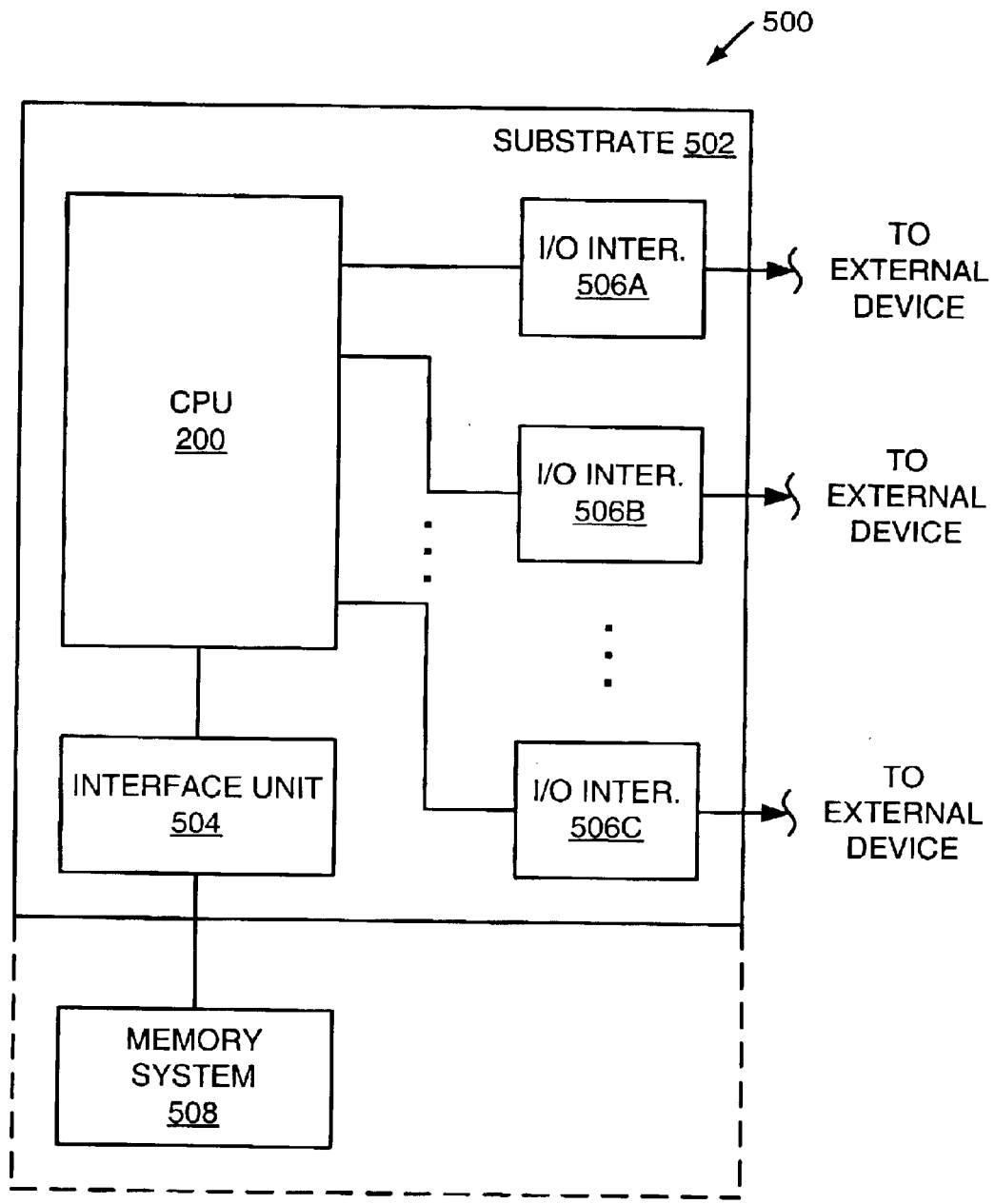
FIG. 8 is a diagram of one embodiment of an exemplary computer system including the CPU of FIG. 3.

FIG. 8 is a diagram of one embodiment of an exemplary computer system 500 including the CPU 200 of FIG. 3. Within the computer system 500, the CPU 200 is formed upon a surface of a semiconductor substrate 502 along with an interface unit 504 and multiple input/output (I/O) interfaces 506A–506C. The interface unit 504 interfaces with a memory system 508. The memory system 508 stores code executed by the CPU 200. As described above, the code may include 32-bit MIPS instructions, MIPS16 instructions, or a combination of 32-bit MIPS instructions and MIPS16 instructions. The I/O interfaces 506 are adapted for coupling to I/O devices external to the substrate 502. One or more of the I/O interfaces 506 may be, for example, a universal asynchronous receiver/transmitter (UART). As indicated in FIG. 8, the memory system 508 may be external to the substrate 502, or formed on the substrate 502.

It will be appreciated by those skilled in the art having the benefit of this disclosure that this invention is believed to be an instruction fetch apparatus and method, and systems including same. Further modifications and alternative embodiments of various aspects of the invention will be apparent to those skilled in the art in view of this description. It is intended that the following claims be interpreted to embrace all such modifications and changes and, accordingly, the drawings and the specification are to be regarded in an illustrative rather than a restrictive sense.

What is claimed is:

1. A computer system, comprising:
    a memory device configured to store a first data segment and a second data segment, wherein the first data segment comprises a first instruction data block and the second data segment comprises a second instruction data block;
    an instruction queuing and selection subsystem configured to receive the first instruction data block, wherein the instruction queuing and selection subsystem is further configured to generate an even portion or an odd portion of the first instruction data block;
    an address generation subsystem configured to generate a first address signal, a second address signal, and a third address signal corresponding to an address of the first instruction data block; and
    a control logic configured to determine a type of instruction fetch case corresponding to the first instruction data block.

2. The computer system as recited in claim 1, wherein the first data segment corresponds to a first instruction set and the second data segment corresponds to a second instruction set.

3. The computer system as recited in claim 1, wherein the instruction queuing and selection subsystem is further configured to receive the second instruction data block.

4. The computer system as recited in claim 1, wherein the second address signal and third address signal corresponds to the first address signal or a variation of the first address signal.

5. The computer system as recited in claim 1, wherein the type of instruction fetch case corresponds to a determining bit of the second address signal and the third address signal.

6. The computer system as recited in claim 5, wherein the determining bit of the second address signal or the third address signal further corresponds to the even portion or the odd portion of the first instruction data block.

7. An instruction fetch apparatus, comprising:
    an instruction queuing and selection subsystem configured to receive a first instruction data block of a first data segment corresponding to a first address signal, wherein the instruction queuing and selection subsystem is configured to select either an even portion or an odd portion of the first instruction data block;
    an address generation subsystem configured to generate the first address signal, a second address signal, and a third address signal, wherein the second, and the third address signals specify an address of the first instruction data block; and
    a control unit configured to determine a type of instruction fetch case corresponding one or more state bits within the control unit.

8. The apparatus as recited in claim 7, wherein the instruction queuing and selection subsystem is further configured to receive a second instruction data block of a second data segment, wherein the second data segment corresponds to a second instruction set and the first data segment corresponds to a first instruction set.

9. The apparatus as recited in claim 7, wherein the instruction queuing and selection subsystem is further configured to receive a control signal from the control unit corresponding to the first instruction data block, and wherein the instruction queuing and selection subsystem is further configured to produce one or more instructions corresponding to the first instruction data block.

10. The apparatus as recited in claim 7, wherein each of the second, and the third address signals further comprises a determining bit configured to differentiate between the even portion or the odd portion of the first instruction data block.

11. The apparatus as recited in claim 10, wherein the one or more state bits correspond to the determining bits of the second address signal and the third address signal.

12. The apparatus as recited in claim 7, wherein the first address signal corresponds to either a non-sequential word address or a next sequential word address, wherein the second address signal corresponds to the first address signal delayed by one cycle of a clock signal, and wherein the third address signal corresponds to the second address signal or a variation of the second address signal.

13. The apparatus as recited in claim 7, wherein the type of instruction fetch case comprises aligned, unaligned sequential, and unaligned non-sequential.

14. A method for fetching two instruction sets, comprising:
    fetching a first instruction data block of a first data segment corresponding to a first address signal;
    generating the first address signal, a second address signal and a third address signal corresponding to an address of the first instruction data block, wherein a portion of the second address signal and the third address signal corresponds to a type of instruction fetch case; and
    generating an even portion or an odd portion of the first instruction data block.

15. The method as recited in claim 14, wherein the step of fetching the first instruction data block further comprises fetching a second data block of a second data segment, wherein the second data segment corresponds to a second instruction set and the first data segment corresponds to a first instruction set.

16. The method as recited in claim 14, wherein the first address signal corresponds to a non-sequential word address or a next sequential word address.

17. The method as recited in claim 14, wherein the step of generating the second address signal comprises delaying the first address signal by one cycle of a clock signal.

18. The method as recited in claim 14, wherein the step of generating the third address signal comprises selecting the second address signal or a variation of the second address signal.

19. The method as recited in claim 14, wherein the type of instruction fetch case corresponds to a determining bit of the second address signal and the third address signal.

20. The method as recited in claim 19, wherein the determining bit of the second address signal or the third address signal corresponds to the even portion or the odd portion of the first instruction data block.

* * * * *